(12) United States Patent
Saisho et al.

(10) Patent No.: US 8,283,049 B2
(45) Date of Patent: Oct. 9, 2012

(54) ALUMINUM BRAZING SHEET

(75) Inventors: Susumu Saisho, Tochigi (JP); Toshiki Ueda, Tochigi (JP); Fumihiro Sato, Tochigi (JP)

(73) Assignee: Kobe Steel, Ltd., Kobe-shi (JP)

( * ) Notice: Subject to any disclaimer, the term of this patent is extended or adjusted under 35 U.S.C. 154(b) by 687 days.

(21) Appl. No.: 10/543,150

(22) PCT Filed: Sep. 26, 2003

(86) PCT No.: PCT/JP03/12350
§ 371 (c)(1),
(2), (4) Date: Jul. 25, 2005

(87) PCT Pub. No.: WO2005/031019
PCT Pub. Date: Apr. 7, 2005

(65) Prior Publication Data
US 2006/0134451 A1 Jun. 22, 2006

(51) Int. Cl.
*B32B 15/20* (2006.01)
*C22C 21/00* (2006.01)

(52) U.S. Cl. .................... 428/654; 428/933; 228/262.51

(58) Field of Classification Search .......................... None
See application file for complete search history.

(56) References Cited

U.S. PATENT DOCUMENTS

| | | | |
|---|---|---|---|
| 2,837,450 A | 6/1958 | Moore | |
| 2,900,713 A * | 8/1959 | Young | 228/173.1 |
| 3,310,389 A | 3/1967 | Doyle et al. | |
| 3,386,221 A * | 6/1968 | Giovannucci | 52/578 |
| 4,991,647 A * | 2/1991 | Kawabe et al. | 165/134.1 |
| 5,011,547 A | 4/1991 | Fujimoto et al. | |
| 5,302,342 A * | 4/1994 | Kawabe et al. | 420/546 |
| 5,407,124 A * | 4/1995 | Bose | 228/262.51 |
| 6,302,973 B1 * | 10/2001 | Haszler et al. | 148/437 |
| 6,921,584 B2 * | 7/2005 | Syslak et al. | 428/654 |
| 2002/0037426 A1 * | 3/2002 | Yamada et al. | 428/654 |
| 2003/0086812 A1 * | 5/2003 | Wittebrood et al. | 420/532 |
| 2004/0118492 A1 * | 6/2004 | Stenqvist | 148/692 |
| 2006/0141282 A1 * | 6/2006 | Ueda et al. | 428/650 |
| 2011/0236717 A1 | 9/2011 | Ueda et al. | |

FOREIGN PATENT DOCUMENTS

| | | |
|---|---|---|
| EP | 0 556 798 | 8/1993 |
| GB | 485292 | 5/1938 |
| JP | 06-184686 | 7/1994 |
| JP | 06-184687 | 7/1994 |
| JP | 07-278710 | 10/1995 |
| JP | 09-095749 | 4/1997 |
| JP | 2000-87163 | 3/2000 |
| JP | 2000-204427 | 7/2000 |
| JP | 2000-210787 | 8/2000 |
| JP | 2000-282163 | 10/2000 |
| JP | 2001-170794 | 6/2001 |
| JP | 2001-179482 | 7/2001 |
| JP | 2003-293063 | 10/2003 |
| WO | WO 00/63008 | 10/2000 |
| WO | WO 02/090031 A1 * | 11/2002 |

OTHER PUBLICATIONS

U.S. Appl. No. 12/335,950, filed Dec. 16, 2008, Koshigoe, et al.
U.S. Appl. No. 12/519,023, filed Jun. 12, 2009, Ueda, et al.
U.S. Appl. No. 12/528,807, filed Aug. 27, 2009, Koshigoe, et al.

* cited by examiner

*Primary Examiner* — John J Zimmerman
(74) *Attorney, Agent, or Firm* — Oblon, Spivak, McClelland, Maier & Neustadt, L.L.P.

(57) ABSTRACT

An aluminum brazing sheet has a core material made of an aluminum alloy and a cladding material cladded on at least one side of the core material and made of an aluminum alloy having a potential lower than that of the core material. The cladding material is made of an aluminum alloy consisting essentially of 0.4 to 0.7 mass % of Mg, 0.5 to 1.5 mass % of Si, and 0.4 to 1.2 mass % of Mn, the remainder being Al and unavoidable impurities. Zn in the amount of 6 mass % or less is added in accordance with need. An aluminum brazing sheet having not only high strength but also less pressure adhesion failure and excellent productivity can be obtained.

5 Claims, No Drawings

ALUMINUM BRAZING SHEET

TECHNICAL FIELD

The present invention relates to an aluminum brazing sheet employed in a header, a side plate, and the like of an automobile radiator and, in particular, to an aluminum brazing sheet for brazing having high strength, high formability, and also excellent productivity.

BACKGROUND ART

Conventionally, an aluminum brazing sheet for brazing has been employed in a header, a side plate, and the like of an automobile radiator, and an Al—Mn based aluminum alloy such as JIS3003 has been employed as a core material. Also, an Al—Si based aluminum alloy such as JIS4045 or JIS4343 has been employed as a brazing material, and an Al—Zn based aluminum alloy has been employed as a cladding material which serves as a sacrificial anode. However, the post-braze strength of the brazing sheet employing an Al—Mn based alloy such as JIS3003 serving as a core material is about 110 N/mm$^2$, which is not sufficient for a brazing sheet. In addition, the above brazing sheet does not have sufficient corrosion resistance. In order to improve the post-braze strength, the addition of Mg to a core material is effective. However, when such a material is employed for brazing together with a flux which generates a brittle compound through reacting with Mg, particularly, as in Nocolok brazing, the brazeability of the brazing sheet in which Mg is added to a core material is significantly deteriorated. Therefore, the addition of Mg to a core material is not preferable.

On the other hand, about 2 mass % of Mg has been added to a cladding material (see Japanese Patent Laid-Open Publications Nos. 2000-210787 and 2000-87163). In this case, Mg added to a cladding material diffuses from the cladding material to a core material during heating for brazing. At the same time, Si diffuses from a brazing material to the core material and is combined with Mg to form Mg$_2$Si. Therefore, the strength can be improved through the addition of Mg to a cladding material.

However, when the above cladding material with high Mg content is laminated with a core material through clad-rolling processing, a blister may be formed on the product surface due to pressure adhesion failure. This results in lower yields of products, so that the productivity is lowered.

SUMMARY OF THE INVENTION

An object of the present invention is to provide an aluminum brazing sheet having not only high strength but also less pressure adhesion failure during clad-rolling and also excellent productivity.

The aluminum brazing sheet according to the present invention comprises a core material made of an aluminum alloy and a cladding material cladded on at least one side of the core material and made of an aluminum alloy having a potential lower than that of the core material, wherein the cladding material is made of an aluminum alloy consisting essentially of 0.4 to 0.7 mass % of Mg, 0.5 to 1.5 mass % of Si, and 0.4 to 1.2 mass % of Mn, the remainder being Al and unavoidable impurities.

According to the present invention, by suppressing the content of Mg in the cladding material and adding both of Si and Mn to the cladding material, the pressure adhesion failure during clad-rolling processing can be prevented, and also the strength can be satisfactorily improved. Therefore, a high-quality aluminum brazing sheet with excellent productivity can be obtained.

In the aluminum brazing sheet of the present invention, the cladding material preferably further contains Zn in the amount of 6 mass % or lower. For example, the cladding material is cladded on one side of the core material, and a brazing material is laminated on the other side of the core material.

Preferably, the Si content of the aluminum alloy constituting the cladding material is in the range of 0.6 to 0.9 mass %.

Preferably, the Mn content of the aluminum alloy constituting the cladding material is in the range of 0.6 to 1.0 mass %.

Further, the core material preferably contains 0.3 to 0.7 mass % of Si, 0.6 to 1.2 mass % of Mn, and 0.5 to 1.0 mass % of Cu.

Examples of the unavoidable impurities contained in the cladding material of the present invention include Fe, Cu, Cr, Ti, and Be. The upper allowable limits of the above elements are 0.5 mass % for Fe, 0.2 mass % for Cu, 0.3 mass % for Cr, 0.2 mass % for Ti, and 10 ppm for Be, respectively.

BEST MODE FOR CARRYING OUT THE INVENTION

The present invention will next be described in more detail. A cladding material has the composition whose potential is lower than that of a core material, and a certain potential difference is maintained between the cladding material and the core material.

In such a cladding material conventionally employed, a large amount of Mg has been added to improve the strength. However, in the present invention, the amount of Mg added to a cladding material is significantly reduced to 0.7 mass % or less, and the reduction in the strength due to the reduction in the added amount of Mg is complemented by the addition of Si and Mn. Since the added amount of Mg is small, the generation of pressure adhesion failure such as a blister may be prevented upon laminating the core material and the cladding material through rolling working. In this manner, the high strength and high productivity of an aluminum brazing sheet can be implemented by reducing the added amount of Mg and by the addition of Si and Mn.

Hereinafter, the reasons for adding each component to the cladding material and for defining the composition will be described.

Mg: 0.4 to 0.7 mass %.

Mg is added to the cladding material in the range of 0.4 mass % or more to obtain sufficient strength. In order to obtain higher strength, Mg is preferably added in a large amount. However, when a large amount of Mg is added, pressure adhesion failure such as a blister is generated during clad-rolling in a manufacturing process. Therefore, the added amount of Mg must be 0.7 mass % or less.

Si: 0.5 to 1.5 mass %, preferably 0.6 to 0.9 mass %.

Si is added to the cladding material together with Mn for complementing the strength thereof. When the added amount of Si is less than 0.5 mass %, the strength is not effectively improved. When the added amount of Si exceeds 1.5 mass %, burning is likely to take place since the addition of Si lowers the melting point. In addition, a Si-based intermetallic compound is formed, thereby lowering the rolling workability. Preferably, the added amount of Si is in the range of 0.6 to 0.9 mass %.

Mn: 0.4 to 1.2 mass %, preferably 0.6 to 1.0 mass %.

Mn is added to the cladding material together with Si for complementing the strength. When the added amount of Mn is less than 0.4 mass %, the strength is not effectively improved. On the other hand, when the added amount of Mn exceeds 1.2 mass %, large precipitates containing Mn are generated, resulting in the formation of microcracks during rolling working. Preferably, the added amount of Mn is in the range of 0.6 to 1.0 mass %.

Zn: 6 mass % or less.

When an aluminum alloy having a low potential is employed as a core material, the addition of Zn to the cladding material is effective for obtaining the potential of the cladding material lower than that of the core material. The addition of Zn to the cladding material results in lowering the potential thereof, thereby effectively allowing the potential of the cladding material to be lower than that of the core material. In this case, when the added amount of Zn exceeds 6 mass %, the rolling workability is likely to be lowered which is not preferable.

In order to fully obtain the sacrificial anode effect of cladding material, the potential of the core material must be higher than that of the cladding material. Therefore, the composition of the core material is selected such that the potential thereof is higher than that of the cladding material. For example, an Al-0.5Si-0.8Cu-1.2Mn alloy (in mass %) may be employed. Since Mg contained in the core material enhances the strength of the core material, Mg may be added to the core material up to 0.3 mass % up to which the brazeability is not inhibited.

A preferred aluminum alloy serving as the core material contains 0.3 to 0.7 mass % of Si, 0.6 to 1.2 mass % of Mn, and 0.5 to 1.0 mass % of Cu. Further, Cr (less than 0.15 mass %) and Ti (less than 0.2 mass %) may be selectively added to the core material.

Examples of the layered structure of the brazing sheet include a two-layer sheet in which one side of the core material is cladded with the cladding material having the above composition, and three-layer sheet in which one side of the core material is cladded with the above cladding material and the other side is cladded with a brazing material.

No particular limitation is imposed on the composition of the brazing material. For example, an Al—Si based alloy such as JIS4045 alloy and an Al—Si—Zn based alloy may be employed. Any cladding ratio between the cladding material/core material/brazing material during cladding may be employed in accordance with the required properties of the applied part.

Examples of the present invention and Comparative Examples will next be described, and the advantages of the present invention will also be described. Cladding materials having compositions shown in Table 1 were prepared. Each of the prepared cladding materials was cladded with a core material (an Al-0.5Si-0.8Cu-1.2Mn alloy with additives of Cr (0.1 mass %) and Ti (0.15 mass %)) and a brazing material (JIS4045) with a cladding ratio of cladding material (10%)/core material (80%)/brazing material (10%), to obtain a three-layer cladding sheet having a final thickness of 1.2 mm. The pressure adhesion property was evaluated through visual observation of a blister generated on the surface of the cladding sheet having a width of 200 mm and a length of 1,000 mm. The portion around the blister was removed from the product, and the pressure adhesion property was represented by "O" in Table 1 if the yield was 90% or more. The pressure adhesion property was represented by "Δ" if the yield was 80 to 90%, and was represented by "x" if the yield was less than 79%. The cladding sheet was cut into a size of 100 mm in width and 230 mm in length, followed by brazing heating through holding the cut cladding sheet at 600☐ for 5 minutes in nitrogen gas. The thus-prepared sheet was subjected to a tensile test (JISZ2201) to measure the post-braze strength.

The post-braze strength is represented by "O" in Table 1 if the tensile strength is 160 Mpa or more.

TABLE 1

| No. | | Composition of cladding material | | | | Post-brazing strength | Pressure adhesion property |
|---|---|---|---|---|---|---|---|
| | | Mg | Si | Mn | Zn | | |
| Example | 1 | 0.52 | 0.71 | 0.89 | 2.26 | o | o |
| | 2 | 0.50 | 0.81 | 0.91 | 2.13 | o | o |
| | 3 | 0.39 | 0.64 | 0.51 | 2.82 | o | o |
| | 4 | 0.59 | 0.66 | 0.49 | 2.60 | o | o |
| | 5 | 0.7 | 1.2 | 1.2 | 2.5 | o | o |
| | 6 | 0.3 | 0.5 | 0.4 | 1.5 | o | o |
| | 7 | 0.3 | 1.2 | 1.2 | 0.3 | o | o |
| | 8 | 0.56 | 0.68 | 0.51 | 3.82 | o | o |
| | 9 | 0.6 | 0.7 | 0.5 | 6.0 | o | o |
| | 10 | 0.5 | 0.85 | 1.0 | — | o | o |
| | 11 | 0.6 | 0.7 | 0.5 | 7.0 | o | Δ |
| Comparative Example | 12 | 2.20 | 0.06 | 0.00 | 1.5 | o | x |
| | 13 | 0.53 | 0.02 | 0.00 | 1.34 | x | o |
| | 14 | 2.20 | 0.06 | 0.00 | 1.5 | o | x |
| | 15 | 0.53 | 0.02 | 0.00 | 1.34 | x | o |
| | 16 | 0.3 | 0.4 | 0.4 | 1.5 | x | o |
| | 17 | 0.7 | 0.4 | 1.2 | 1.5 | x | o~Δ |
| | 18 | 0.2 | 1.2 | 1.2 | 1.5 | x | o |
| | 19 | 0.7 | 1.2 | 0.3 | 1.5 | x | o~Δ |
| | 20 | 0.8 | 0.5 | 0.4 | 0.5 | o | x |
| | 21 | 0.5 | 2.0 | 0.4 | 1.5 | Test piece unable to be processed | x |
| | 22 | 0.5 | 1.0 | 1.4 | 0.5 | Test piece unable to be processed | x |

As shown in Table 1, the aluminum brazing sheet of Examples 1 to 11 had excellent cladding pressure adhesive property and post-braze strength since the composition of the cladding material falls within the scope of the claims of the present invention. On the other hand, the aluminum brazing sheet of Comparative Examples 12, 14, and 20 had lower pressure adhesive property due to the high content of Mg. The aluminum brazing sheet of Comparative Examples 13 and 15 had insufficient post-braze strength since the Mn content is too low. The post-braze strength was unsatisfactory in Comparative Examples 16 and 17 since the Si content is too low and also in Comparative Examples 18 since the Mg content is too low and in Comparative Example 19, since the Mn content is too low. Since the aluminum brazing sheet of Comparative Example 21 had low rolling workability due to the high content of Si, a test piece for the tensile test was unable to be processed. A crack was generated in the aluminum brazing sheet of Comparative Example 22 during rolling since the content of Mn is too high, and thus a test piece for the tensile test was unable to be processed.

The invention claimed is:

1. An aluminum brazing sheet consisting of:
   a core material made of an aluminum alloy;
   a cladding material cladded on one side of the core material; and
   a brazing material laminated on the side of the core material opposite to the cladding material;
   wherein
   a potential of the cladding is lower than a potential of the core and a sacrificial anode effect is obtained,
   the cladding material is an aluminum alloy consisting of
   from 0.52 to 0.7 mass % of Mg,
   0.5 to 1.5 mass % of Si,
   0.4 to 1.2 mass % of Mn, 0.3 to 6 mass % of Zn,
Al, and the core material consists of:
0.3 to 0.7 mass % of Si,
0.6 to 1.2 mass % of Mn,
0.5 to 1.0 mass % of Cu,
a maximum of 0.3 mass % Mg,
from 0.15 to 0.2 mass % Ti,
from 0.1 to 0.15 mass % Cr, and
Al.

2. The aluminum brazing sheet according to claim 1, wherein the Si content of the cladding material is in a range of 0.6 to 0.9 mass %.

3. The aluminum brazing sheet according to claim 1, wherein the Mn content of the cladding material is in a range of 0.6 to 1.0 mass %.

4. The aluminum brazing sheet according to claim 2, wherein the Mn content of the aluminum alloy constituting the cladding material is in a range of 0.6 to 1.0 mass %.

5. The aluminum brazing sheet according to claim 1, wherein the Zn content of the cladding material is 2.0 to 6.0 mass %.

* * * * *